United States Patent [19]

Murakami et al.

[11] Patent Number: 4,673,980
[45] Date of Patent: Jun. 16, 1987

[54] VIDEO-SIGNAL TIME-AXIS CORRECTION APPARATUS

[75] Inventors: Keinosuke Murakami; Kazumasa Enami; Nobuyuki Yagi, all of Tokyo, Japan

[73] Assignee: Nippon Hoso Kyokai, Japan

[21] Appl. No.: 865,988

[22] Filed: May 22, 1986

[30] Foreign Application Priority Data

May 24, 1985 [JP] Japan ................................. 60-110120

[51] Int. Cl.$^4$ ........................................... H04N 5/073
[52] U.S. Cl. ........................................ 358/149; 358/19
[58] Field of Search ............... 358/148, 149, 150, 153, 358/19

[56] References Cited

U.S. PATENT DOCUMENTS

| 4,109,276 | 8/1978 | Hopkins, Jr. | 358/19 |
| 4,120,000 | 10/1978 | Ninomiya | 358/148 |
| 4,231,063 | 10/1980 | Ito | 358/148 |
| 4,445,135 | 4/1984 | Heitmann | 358/149 |

Primary Examiner—Tommy P. Chin
Attorney, Agent, or Firm—Parkhurst & Oliff

[57] ABSTRACT

A time-axis of a digital video-signal is converted to a standard time-axis by changing a clock signal contained therein to a standard clock signal and by locking phases of input synchronizing signals contained therein onto the phase of the standard clock signal through a memory for alternately writing and reading the digital video signal at one half of the period of the standard clock signal. As a result, the time-axis correction of the digital video signal is efficiently effected through the memory having a small capacity and a simplified controlling arrangement.

3 Claims, 19 Drawing Figures

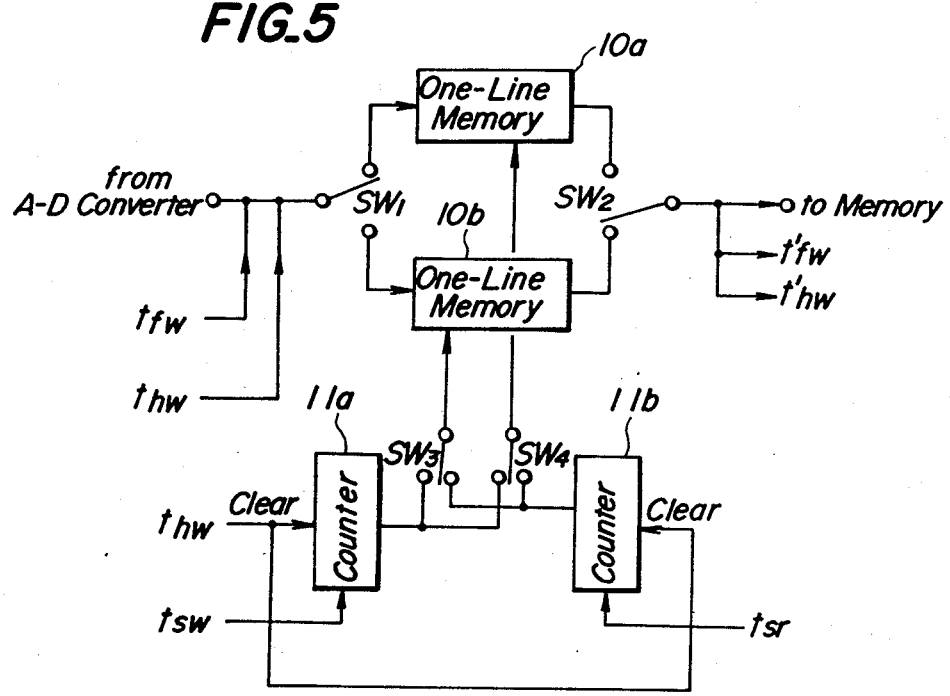
FIG. 5
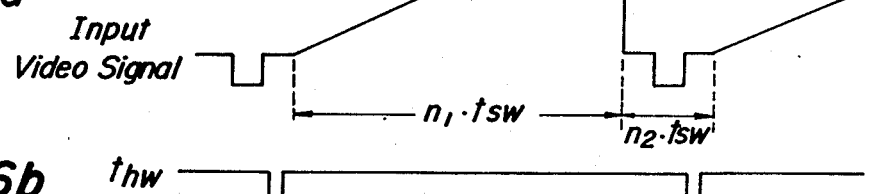
FIG. 6a Input Video Signal
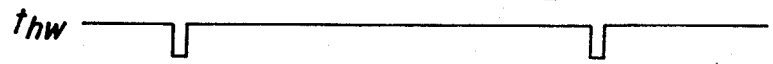
FIG. 6b $t_{hw}$
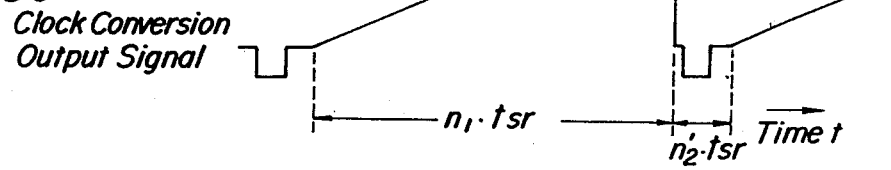
FIG. 6c Clock Conversion Output Signal

VIDEO-SIGNAL TIME-AXIS CORRECTION APPARATUS

BACKGROUND OF THE INVENTION

Field of the Invention and Related Art Statement

The present invention relates to a video-signal time-axis correction apparatus provided for locking synchronizing signals of an externally supplied video-signal in phase onto those prepared within a TV station, for correcting temporal fluctuation of a video-signal reproduced from VTR and for the like.

As for conventional video-signal time-axis correction apparatuses of this kind, a frame synchronizer, a time base corrector (TBC) and the like are well-known. The present invention is intended for simplifying the configuration employing memories of these conventional apparatuses.

First of all, for clarifying difficulties contained in the conventional configuration thereof, the basic operation of these conventional apparatuses will be described hereinafter by referring to FIG. 1.

FIG. 1 is a block diagram showing the basic configuration of the conventional frame synchronizer, TBC and the like. In FIG. 1, an input analog video signal is converted to an input digital video signal through an A-D converter 1, the latter being written in a memory 2. The timings of the conversion in the A-D converter 1 and the writing in the memory 2 are controlled by synchronizing signals separated from the input analog video signal through a synchronizing signal separator 5. On the other hand, the timing of the reading of an output digital video signal from the memory 2 is controlled by standard synchronizing signals supplied through a synchronizing signal reproducer 8, the latter synchronizing signals being prepared in the TV station apart from the former at all. As a result, the correction of nonstandardized time-axis of the input analog video signal can be effected.

Further speaking in detail by referring to FIGS. 2(a) to 2(g), in the synchronizing signal separator 5, writing clear pulses as shown in FIG. 2(b) and writing clock pulses as shown in FIG. 2(c) are generated on the basis of the vertical and the horizontal synchronizing signals and color burst signals contained in the input analog video signal. The writing clear pulses are situated at the timing corresponding to the blanking intervals of the input analog video signal, so as to clear a counter provided in a writing address generator 6 for counting the writing clock pulses at the timing concerned. The writing clock pulses effect the counting-up of thus cleared counter, so as to generate writing addresses for the memory 2 as shown in FIG. 2(d), as well as these pulses are employed as for sampling pulses driving the A-D converter 1.

The writing addresses for the memory 2 are obtained from the input analog video signal as mentioned above, so that, even if any jitter is contained in the input analog video signal, the same jitter is contained in those writing addresses also and hence the input digital video signal can be always written in the memory 2 in a well-regulated situation.

On the other hand, as for the reading-out of the memory 2, reading addresses as shown in FIG. 2(f) are generated in a reading address generator 7 from reading clock pulses and reading clear pulses as shown in FIG. 2(e), which are generated on the basis of vertical and horizontal synchronizing signals and color burst signals contained in a standard synchronizing signal adopted in the TV station.

This reading address generator 7 is operated at the timing quite unrelated to that of the writing address generator 6, at which timing an output digital video signal is read out from the memory 2 as shown in FIG. 2(g).

Consequently, respective timings on input and output sides of the configuration as shown in FIG. 1 can be isolated from each other through the memory. This is the operational principle of the time-axis correction apparatus in general.

It is clarified by investigating the above described operation with regard to the memory that both of the writing and the reading accesses based on respective timings being isolated from each other are required to be simultaneously attained.

For the above simultaneous attainment, the procedure as shown in FIGS. 3(a) to 3(c) has been conventionally adopted. As shown in FIG. 3(c), the access operation of the memory is restricted within one third of the time duration of the above described writing access based on writing clock pulses. This time duration is divided into three sections of one third thereof, one of which sections is fixedly allotted to the actual writing access as indicated by a mark W. The remaining two sections as indicated by marks $R_1$ and $R_2$ are allotted to the actual reading access such as one of these remaining sections, that is, $R_1$ or $R_2$ can be arbitrarily allotted thereto. As a result, the actual writing access can be necessarily effected within the section indication by the mark W, meanwhile the actual reading access can be effected within one of the remaining sections indicated by the marks $R_1$ and $R_2$ in spite of any phase relation between the aforesaid writing access and the aforesaid reading access. In this connection, it is required to select the section indicated by the mark $R_1$ or $R_2$ in response to the detected phase relation between the aforesaid writing and reading accesses. A memory address generator 4 is employed for realizing this procedure and hence has a fairly complicated arrangement. Actually, this memory address generator occupies a large part of the configuration of the conventional apparatus of this kind of such as the frame synchronizer.

OBJECT AND SUMMARY OF THE INVENTION

An object of the present invention is to provide a video-signal time-axis correction apparatus in which, although the aforesaid basic principle whereby, in the correction of the time-axis of the video signal, the phase and the frequency of synchronizing signals thereof are corrected through the memory, is adopted, the aforesaid mutual isolation of respective timings for the writing and the reading of the memory is achieved through a simplified configuration far away from the complication such as the above conventional procedure based on the division of the access time duration into three sections.

Another object of the present invention is to provide a video-signal time-axis correction apparatus prevented from difficulties such as the adjustment and the maintenance of the operational timings in the conventional apparatus of this kind are fairly troublesome because of the confused processing of various signals having phases different from each other, on account of the limitation of circuit means required for the aforesaid isolation of operational timings.

Accordingly, the present invention is featured in that the configuration as shown in FIG. 1 is improved by the insertion between the A-D converter 1 accompanied by the synchronizing signal separator 5 and the memory 2 accompanied by the controlling circuitry, of a clock converter in which the writing clock pulses (c) based on the input synchronizing signals are converted to standard clock pulses based on the standard synchronizing signals, as well as the phases of the input synchronizing signals are locked onto those of the standard clock pulses, and, as a result, the aforesaid necessary mutual isolation of operational timings can be achieved by simple alternate switching between the writing addresses (d) and the reading addresses (f) for the memory 2 at one half of the period of the standard clock pulses in a memory address generator 4 for applying those addresses onto the memory 2.

BRIEF DESCRIPTION OF THE DRAWINGS

For the better understanding of the invention, reference is made to the accompanying drawings, in which:

FIG. 5 is a block diagram showing an example of a configuration of a clock converter consisting in the same;

FIGS. 6(a) to 6(c) are timing charts showing schematically signal waveforms at various portions of the same respectively;

Figure 1:
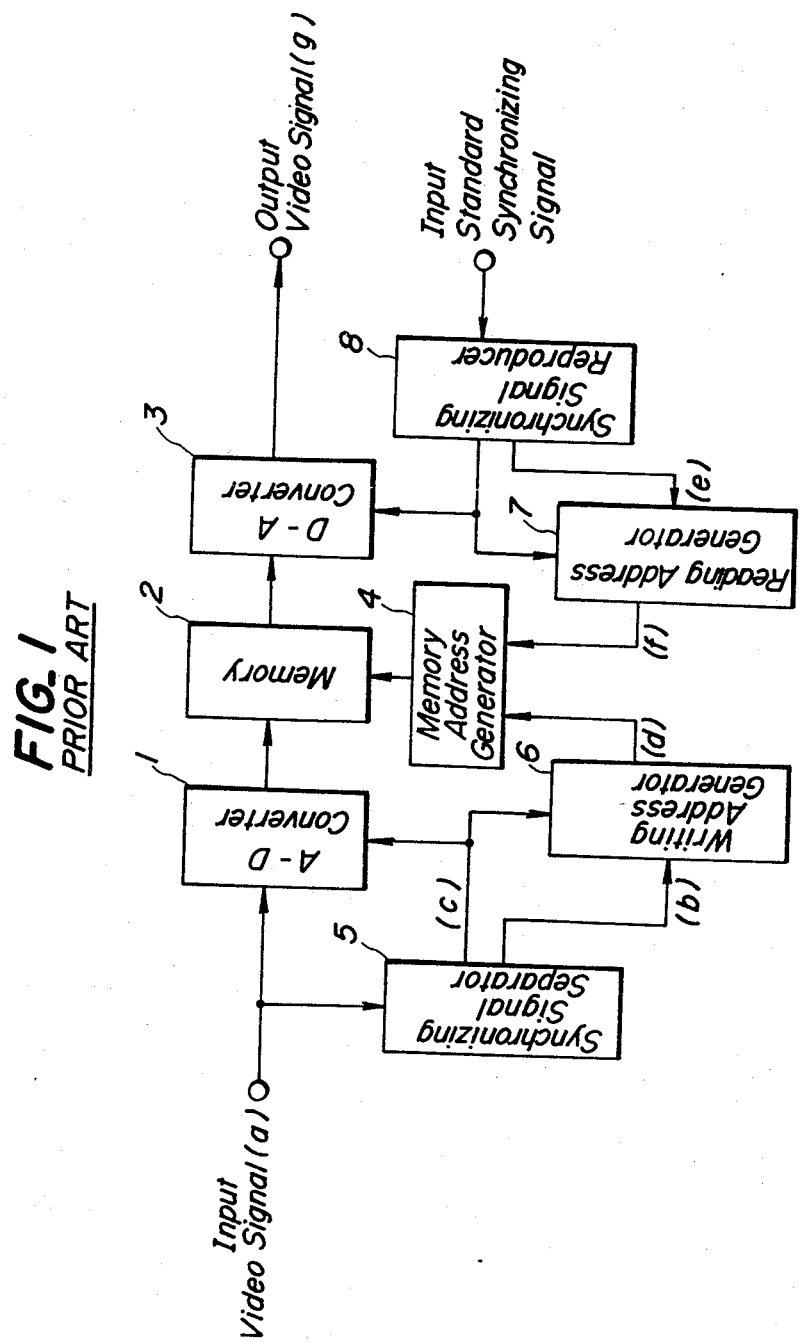
FIG. 1 is a block diagram showing an example of a configuration of a conventional video-signal time-axis correction apparatus as described above.
Figure 2:
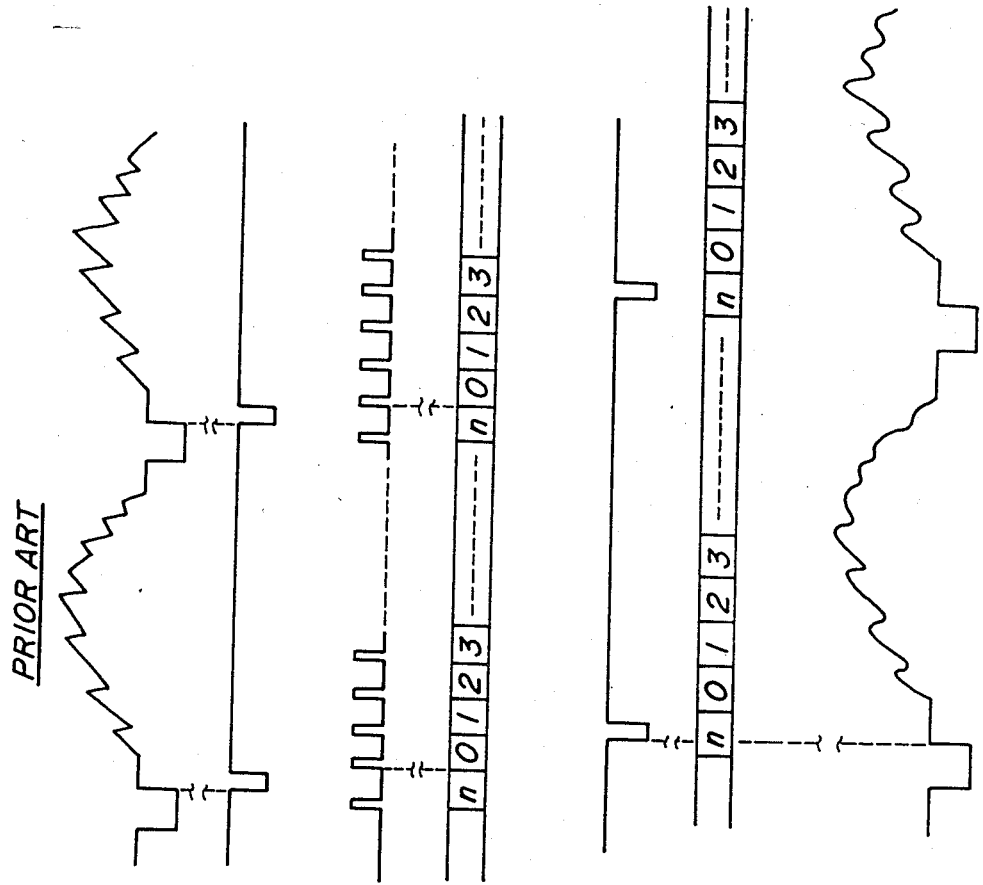
FIGS. 2(a) to 2(g) are timing charts showing signal waveforms at various portions of the same respectively as described above.
Figure 3:
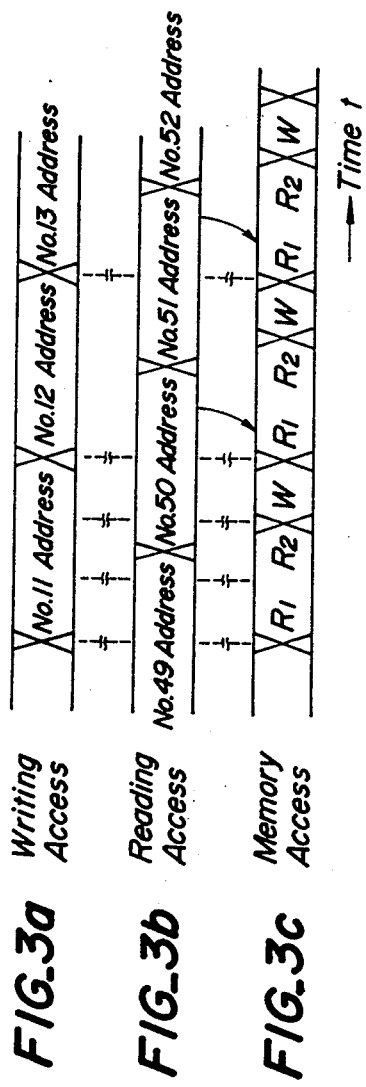
FIGS. 3(a) to 3(c) are timing charts showing examples of successive memory access required for mutually isolating those memory accesses in the same respectively as described above.

Throughout different views of the drawings; 1 denotes an A-D converter, 2 denotes a memory, 3 denotes a D-A converter, 4 denotes a memory address generator, 5 denotes a synchronizing signal separator, 6 denotes a writing address generator, 7 denotes a reading address generator, 8 denotes a synchronizing signal reproducer, 9 denotes a clock converter, 10a and 10b denote one-line memories, 11a and 11b denote counters, 12 denotes a comparator, 13 denotes a register file and 14 denotes an AND gate.

DETAILED DESCRIPTION OF PREFERRED EMBODIMENTS

A preferred embodiment of the present invention will be described in detail by referring to FIGS. 4, 5 and 6(a) to 6(c) hereinafter. With regard to the memory 2, the period of the aforesaid writing clock pulses is designated by $t_{sw}$, the period of the horizontal synchronizing signal of the input video signal is designated by $t_{hw}$ and the period of the frame synchronizing signal of the same is designated by $t_{fw}$, as well as the period of the aforesaid reading clock pulses is designated by $t_{sr}$, the period of the standard horizontal synchronizing signal adopted in the TV station is designated by $t_{hr}$ and the period of the standard frame synchronizing signal adopted in the same is designated by $t_{fr}$. In this situation, the aforesaid procedure of the video-signal time-axis correction apparatus of this kind can be regarded as the combination of conversion processes as expressed by the following formulas (1) to (3) respectively.

$$t_{sw} \rightarrow t_{sr} \quad (1)$$

$$t_{hw} \rightarrow t_{hr} \quad (2)$$

$$t_{fw} \rightarrow t_{fr} \quad (3)$$

In this connection, mutual relations as expressed by the following formulas (4) to (7) exist between each other of the above designated periods with regard to the so-called NTSC signal.

$$t_{fw} = 525 \cdot f_{hw} \quad (4)$$

$$t_{hw} = n \cdot t_{sw} = (n_1 + n_2) \cdot t_{sw} \quad (5)$$

$$t_{fr} = 525 \cdot f_{hr} \quad (6)$$

$$t_{hr} = n \cdot f_{sr} = (n_1 + n_2) \cdot t_{sr} \quad (7)$$

Herein, n denotes the number of samples contained in one line period, $n_1$ denotes the number of samples contained within the effective portion thereof and $n_2$ denotes the number of samples contained in the line blanking interval.

In the conventional configuration as shown in FIG. 1, all of the above conversion processes as expressed by the formulas (1) to (3) are intended to be achieved in the memory 2 accompanied by the controlling circuitry thereof.

In contrary therewith, according to the present invention, these attended conversion processes can be simply effected through the addition of an intermediate procedure as expressed by the following formulas (8) to (10), wherein only the period of clock pulses is converted similarly as in the conventional configuration, meanwhile the remaining periods are substantially maintained as those are, $$t_{sw} \rightarrow t_{sr} \rightarrow t_{sr} \quad (8)$$

$$t_{hw} \rightarrow t_{hw} \rightarrow t_{hr} \quad (9)$$

$$t_{fw} \rightarrow t_{fw} \rightarrow t_{fr} \quad (10)$$

As a result of the above intermediate procedure, an intermediate mutual relation as expressed by the following formula (11) can be obtained by changing the sample number $n_2$ in the formula (7) to another sample number $n_2'$ as shown schematically in FIGS. 6(a) to 6(c).

$$t_{hw} = (n_1 + n_2') \cdot t_{sr} \quad (11)$$

However, in this situation, the above mutual relations as expressed by the formulas (4) to (7) cannot be maintained, so that the sample number $n_2$ in the line blanking interval as shown in FIG. 6(a) is intended to be changed to the other sample number $n_2'$ as shown in FIG. 6(c) by the increase or the decrease of the sample number $n_2$.

Figure 4:
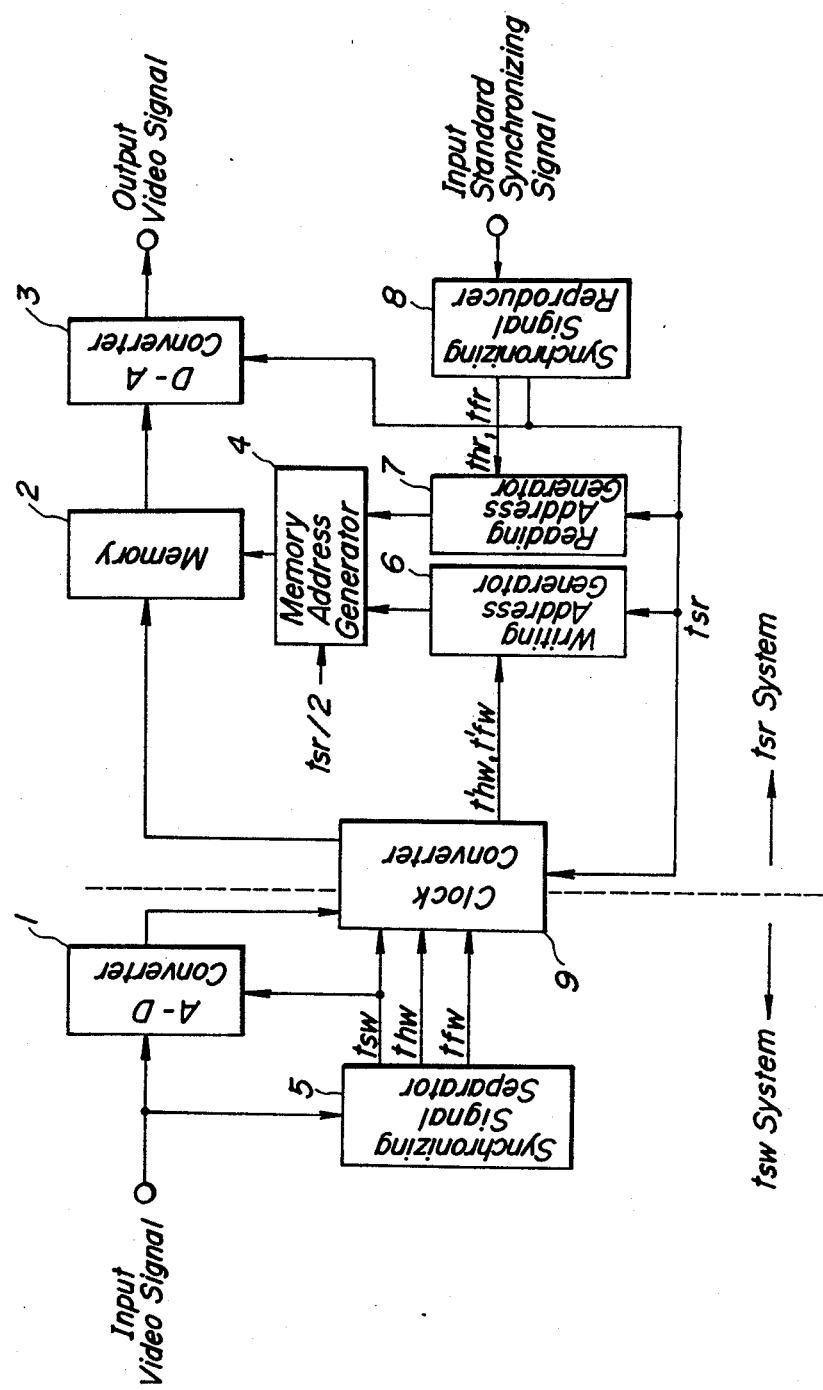
FIG. 4 is a block diagram showing an example of a configuration of a video-signal time-axis correction apparatus according to the present invention.

In a configuration as shown in FIG. 4 according to the present invention, a clock converter 9 is added to the conventional configuration as shown in FIG. 1, as well as the writing address generator 6 is affected by a minor change such as driven by the standard reading clock pulses having the period $t_{sr}$. As a result, the memory address generator 4 is simplified as a simple change-over switcher operated at the period of $t_{sr}/2$, on the basis of the fact that all of the circuits residing on the right side of a vertical dotted line in FIG. 4 are operated at the timing based on the period $t_{sr}$ of the standard reading clock pulses and hence the aforesaid mutual isolation of timings between the writing and the reading of the memory, that is, the antisynchronized memory access is no longer necessitated.

An example of the arrangement of the aforesaid clock converter 9 is shown in FIG. 5. The arrangement as shown in FIG. 5 comprises two groups of one-line memories 10a and 10b accompanied by two counters 11a and 11b, which memories 10a and 10b are alternately operated at the period of one-line through the combination of four change-over switches $SW_1$ to $SW_4$ such as the input digital one-line signal is written in one of these memories 10a, 10b at the timing based on the period $t_{sw}$ of the input writing clock pulses, meanwhile the output digital one-line signal is read out from the other of these memories 10a, 10b at the timing based on the period $t_{sr}$ of the standard reading clock pulses.

In the above described procedure, if the input digital one-line video signal written-in at the interval $(n_1+n_2) \cdot t_{sw}$ as shown in FIG. 6(a) will be read-out at the subsequent interval $(n_1+n_2') \cdot t_{sr}$ on an exemplified condition $t_{sr} > t_{sw}$, the effective signal interval will be elongated such as expressed by $n_1 \cdot t_{sr} > n_1 \cdot t_{sw}$ as shown in FIG. 6(c). Meanwhile, the counter 11a, 12a for addressing the one-line memories 10a, 10b are fixedly cleared in common at the period $t_{hw}$ of the input horizontal synchronizing signal. As a result, as is apparent from FIG. 6(c), the sample number $n_2'$ in the line blanking interval is reduced by the elongated effective interval. The output one-line video signal processed through the intermediate procedure as described above is written in the memory 2 similarly as conventionally shown in FIG. 1 and hence the regular length of the line blanking period can be resorted, so as to attain the intended time-axis correction. In this connection, the relation of signal levels in the line blanking interval is irregulated. However, this resultant irregularity can be obviated by replacing the line synchronizing signal later.

In the configuration as shown in FIG. 4 according to the present invention, the clock converter 9 configurated as shown in FIG. 5 is superfluously necessitated in addition to the conventional configuration as shown in FIG. 1. However, this additional clock converter 9 can be fairly readily realized in comparison with the memory address generator 4 complicated as described earlier. In this clock converter also, writing and reading clock pulses having respective periods $t_{sw}$ and $t_{sr}$ isolated from each other are required to be treated in parallel. However, this parallel treatment is effected through two one-line memories, so that the completion accompanying the high speed treatment such as required for the memory address generator 4 in FIG. 1 is not caused at all.

In this connection, the clock converter 9 in FIG. 4 outputs the intermediate horizontal synchronizing signal having the period $t_{h'w}$ and the intermediate frame resynchronizing signal having the priod $t_{f'w}$ together with the digital video signal in which the period of sampling clock is converted from $t_{sw}$ to $t_{sr}$. These intermediate periods $t_{h'w}$ and $t_{f'w}$ substantially correspond respectively to periods and phases of the input horizontal and the input frame synchronizing signals. However, trangent portions of these intermediate periods $t_{h'w}$, $t_{f'w}$, namely, for instance, leading edge portions of signal waveforms are locked onto the phase of the period $t_{sr}$ of the standard clock pulses in the TV station. In other words, the periods $t_{hw}$ and $t_{fw}$ of the input horizontal and the input frame synchronizing signals are applied with the same treatment as the conversion of sampling periods of the input video signal.

The restrictive condition applied onto the practice according to the present invention can be expressed by the following formula.

$$n_2' \cdot t_{sr}(=n \cdot t_{sw} - n_1 \cdot t_{sr}) \geq 0$$

This is the fact that the irregularity of time-axis of the video-signal which necessitates the eating-up of the line blanking interval cannot be corrected. However, such an irregularity of time-axis is actually seldom caused.

Figure 7:
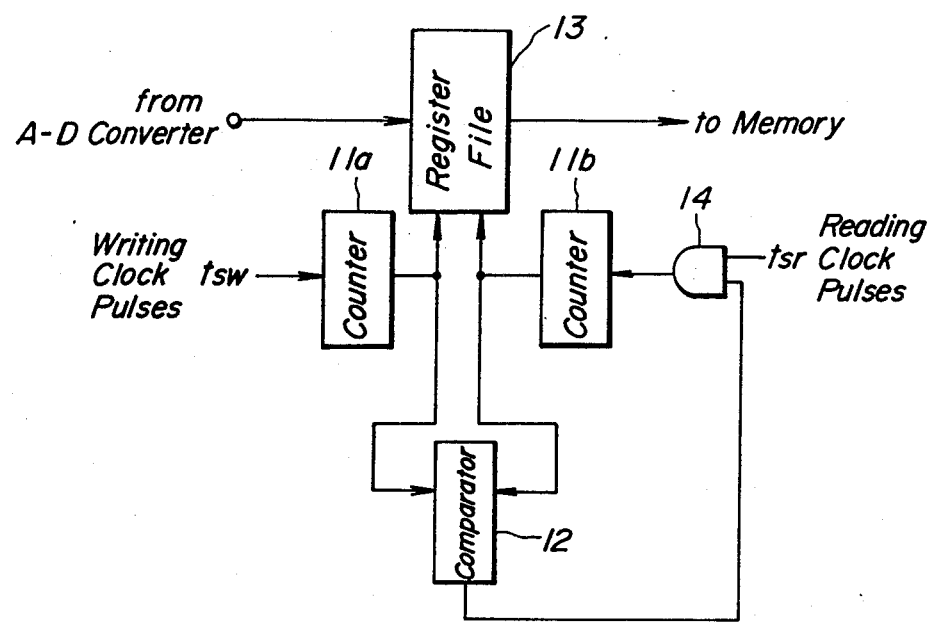
FIG. 7 is a block diagram showing a configuration of a conventional clock converter.
Figure 8:
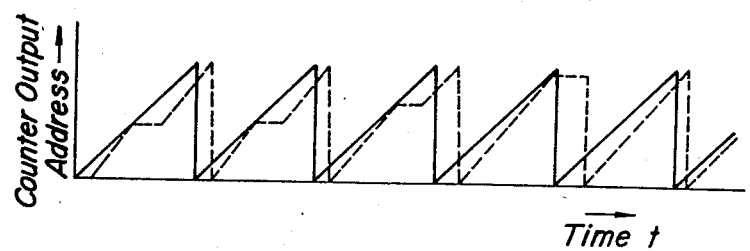
FIG. 8 is a timing chart showing signal waveforms of counters consisting in the same.

By the way, a conventional time-axis correction apparatus in which the time-axis correction is effected through the two-stage procedure constituted by providing the clock converter preceding the memory similarly as according to the present invention has been disclosed in the article: M. L. Sanders (Ampex) "Digital time base corrector of video tape recorders" MONITOR PROG., IREE, April '76. The clock converter of this conventional apparatus is, as shown in FIG. 7, constituted by providing a register file 12 corresponding to Ser. No. 74670 type having a capacity of a few words without the necessity of one-line memory capacity, as well as it facilitates the simultaneous access for the writing and the reading. The particular difference of this conventional clock converter from that of the present invention exists in the fact that, under the comparison between respective output addresses of the counters 11a and 11b provided on the writing and the reading sides respectively, the output reading address is maintained not to exceed the output writing addresss by stopping the supply of the standard reading clock pulses as shown in FIG. 8, in which the solid and the dotted lines indicate output addresses of those counters 11a and 11b respectively. As is apparent from FIG. 8, in a moment in which the output address of the counter 11b coincides with the output address of the counter 11a and hence the former is about to exceed the latter, the counting-up of the counter 11b is once stopped.

Figure 9:
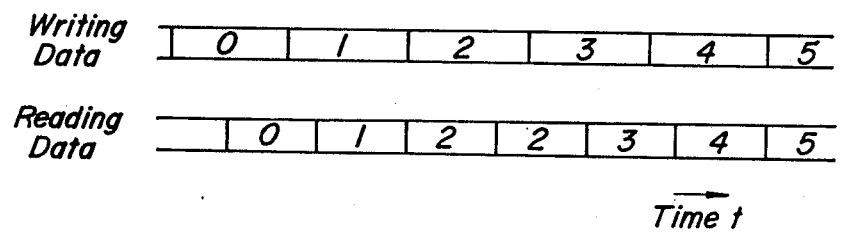
FIGS. 9(a) and 9(b) are timing charts showing schematically writing data and reading data of a register file in the same respectively.

During the above stopping of counting-up, the counter 11b repeatedly outputs the same output address as shown in FIG. 9(b) in contrast with FIG. 9(a), the former showing the output address of the counter 11b, meanwhile the latter showing that of the counter 11a.

On the contrary, in a situation where the output address of the counter 11b is delayed in comparison with that of the counter 11a, the delayed output reading address is skipped and hence the subsequent output reading address is immediately effected, so as to anyway absorb the phase difference between the writing and the reading output addresses.

In other words, this conventional clock converter is intended to carry out the time-axis correction through the repetition and the omission of picture elements regardless of the period thereof being effective or not. Accordingly, this conventional clock converter has the following various defects.

(1) In a situation where the excession or the estrangement of output addresses between the writing and the reading is frequently caused, the irregularity appears in the picture.

(2) The repetition and the omission of picture elements in the composite color picture signal causes the irregular variation of chrominance, so that it is required to effect these procedures within the frequency range of the color subcarrier.

(3) The complexity of circuit configuration of the address comparator and the like is inevitably caused.

(4) Although the register file is not required to have the capacity of one-line, but required to have the capacity enough to obviate the frequent occurrence of the above excession and the above estrangement of output addresses, the capacity thereof cannot be enlarged in comparison with that of RAM and hence the circuit arrangement thereof inevitably enlarged.

As is apparent from the described above, according to the present invention, the circuits for the video signal time-axis correction, the circuits required for mutually isolating the access timings between the writing and the reading of the memory used for the time-axis correction can be extremely simplified. Consequently, the configurations of the frame synchronizer, TBC and the like can be simplified at a large extent, and hence the costs thereof can be expected to be fairly lowered.

What is claimed is:

1. A video-signal time-axis correction apparatus for converting an input time-axis based on an input video signal to a standard time-axis by changing an input clock signal indicating the input time-axis to a standard clock signal indicating the standard time-axis, comprising an analog to digital converting means for converting an input analog video-signal to an input digital video-signal under the control of said input clock signal, a synchronizing signal separating means for separating input synchronizing signals from said input analog video-signal and generating said input clock signal on the basis of said input synchronizing signals, a synchronizing signal reproducing means for generating said standard clock signal from standard synchronizing signals externally supplied on the basis of said standard time-axis, a clock converting means for converting said input synchronizing signals derived from said synchronizing signal separating means to output synchronizing signals being in phase with said standard clock signal derived from said synchronizing signal reproducing means, a memory means for memorizing said input digital video signal obtained in said analog to digital converting means, a writing address generating means for generating writing addresses for controlling the writing of digits of said input digital video signal into said memory means under the control of said standard clock signal derived from said synchronizing signal reproducing means and said output synchronizing signals derived from said clock converting means, a reading address generating means for generating reading addresses for controlling the reading of said digits from said memory means under the control of said standard clock signal and said standard synchronizing signals derived from said synchronizing signal reproducing means, a memory address generating means for generating memory addresses for alternately controlling the writing and the reading of said digits in said memory means for alternately switching said writing addresses and said reading addresses at one half of the period of said standard clock signal, so as to convert said input digital video signal to an output digital video signal, and a digital to analog converting means for converting said output digital video-signal derived from said memory means to an output analog video signal based on said standard time-axis under the control of said standard clock signal derived from said synchronizing signal reproducing means.

2. A video-signal time-axis correction apparatus as claimed in claim 1, wherein said input digital video signal is supplied to said memory means through said clock converting means in which said input clock signal contained in said input digital video-signal is converted to said standard clock signal.

3. A video-signal time-axis correction apparatus as claimed in claim 2, wherein said clock converting means comprises two one-line memory means for being alternately used for alternately writing-in and reading-out said input digital video signal, a first counting means for counting said input clock signal at the period of the input line synchronizing signal, so as to control the writing-in of said two one-line memory means, and a second counting means for counting said standard clock signal at the period of the input line synchronizing signal, so as to control the reading-out of said two one-line memory means.

* * * * *